US006565628B2

(12) United States Patent
Xu et al.

(10) Patent No.: US 6,565,628 B2
(45) Date of Patent: May 20, 2003

(54) PRESSURE SWING ADSORPTION PROCESS WITH REDUCED PRESSURE EQUALIZATION TIME

(75) Inventors: Jianguo Xu, Wrightstown, PA (US); David Lester Rarig, Emmaus, PA (US); Tracey Ann Cook, Blandon, PA (US); Kuo-Kuang Hsu, Macungie, PA (US); Michelle Schoonover, Macungie, PA (US); Rakesh Agrawal, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/911,002

(22) Filed: Jul. 23, 2001

(65) Prior Publication Data

US 2003/0015091 A1 Jan. 23, 2003

(51) Int. Cl.$^7$ .............................................. B01D 53/047
(52) U.S. Cl. .............................. 95/100; 95/103; 95/105; 95/130; 95/139; 95/140; 95/143; 96/130; 96/144
(58) Field of Search .................... 95/96–105, 130, 95/139, 140, 143; 96/130, 144

(56) References Cited

U.S. PATENT DOCUMENTS

| | | | |
|---|---|---|---|
| 3,986,849 A | 10/1976 | Fuderer et al. .................. 55/25 |
| 4,077,779 A | 3/1978 | Sircar et al. .................... 55/25 |
| 4,234,322 A | 11/1980 | De Meyer et al. ............... 55/18 |
| 4,315,759 A | 2/1982 | Benkmann ...................... 55/18 |
| 4,371,380 A | 2/1983 | Benkmann ...................... 55/26 |
| 4,375,363 A | * 3/1983 | Fuderer ...................... 95/103 X |
| 4,402,712 A | 9/1983 | Benkmann ...................... 55/26 |
| 4,468,237 A | 8/1984 | Fuderer .......................... 55/26 |
| 4,512,778 A | 4/1985 | Simonet et al. ................. 55/26 |
| 4,650,500 A | 3/1987 | Patel .............................. 55/26 |
| 4,834,780 A | 5/1989 | Benkmann ...................... 55/26 |
| 5,015,272 A | 5/1991 | Okada et al. ................... 55/26 |
| 5,203,888 A | 4/1993 | Maurer .......................... 55/26 |
| 5,248,322 A | 9/1993 | Kumar ......................... 95/101 |
| 5,294,247 A | 3/1994 | Scharpf et al. ............... 95/101 |
| 5,354,346 A | 10/1994 | Kumar ......................... 95/101 |
| 5,656,065 A | * 8/1997 | Kalbassi et al. .......... 95/105 X |
| 6,045,603 A | 4/2000 | Chen et al. .................... 95/101 |
| 6,083,299 A | * 7/2000 | Kapoor et al. ............. 95/105 X |
| 6,113,672 A | * 9/2000 | Kapoor et al. ............. 95/105 X |
| 6,210,466 B1 | 4/2001 | Whysall et al. ............... 95/100 |
| 6,379,431 B1 | * 4/2002 | Xu et al. .................. 95/103 X |

* cited by examiner

Primary Examiner—Robert H. Spitzer
(74) Attorney, Agent, or Firm—John M. Fernbacher

(57) ABSTRACT

A method to reduce the cycle time in a pressure swing adsorption process by reducing the required pressure equalization time in a cycle, thereby reducing the overall cycle time and increasing product recovery per unit of adsorbent used. This reduces the amount of adsorbent required in the beds for a given feed rate while continuing to provide product at an acceptable product purity, and has the desirable effect of reducing the capital cost of the process equipment required for a given volumetric production rate.

30 Claims, 11 Drawing Sheets

| | | | | | | | | | | | | | | | | | | | | | | | | | | |
|---|---|---|---|---|---|---|---|---|---|---|---|---|---|---|---|---|---|---|---|---|---|---|---|---|---|---|
| A | Feed | | | | | 1 | 2 | 3 | 4 | | PP | | BD | | Pu | | | I | 4' | 3' | 2' | 1'/R | R |
| B | 1'/R | R | Feed | | | | | 1 | 2 | 3 | 4 | | PP | | BD | | Pu | | | I | 4' | 3' | 2' |
| C | 3' | 2' | 1'/R | R | Feed | | | | | 1 | 2 | 3 | 4 | | PP | | BD | | Pu | | | I | 4' |
| D | I | 4' | 3' | 2' | 1'/R | R | Feed | | | | | 1 | 2 | 3 | 4 | | PP | | BD | | Pu | |
| E | Pu | | I | 4' | 3' | 2' | 1'/R | R | Feed | | | | | 1 | 2 | 3 | 4 | | PP | | BD | | Pu |
| F | Pu | | | I | 4' | 3' | 2' | 1'/R | R | Feed | | | | | 1 | 2 | 3 | 4 | | PP | | BD | Pu |
| G | Pu | | | | I | 4' | 3' | 2' | 1'/R | R | Feed | | | | | 1 | 2 | 3 | 4 | | PP | | BD |
| H | BD | | Pu | | | | I | 4' | 3' | 2' | 1'/R | R | Feed | | | | | 1 | 2 | 3 | 4 | | PP |
| I | | BD | | Pu | | | | I | 4' | 3' | 2' | 1'/R | R | Feed | | | | | 1 | 2 | 3 | 4 | PP |
| J | PP | | BD | | Pu | | | | I | 4' | 3' | 2' | 1'/R | R | Feed | | | | | 1 | 2 | 3 | 4 |
| K | PP | | | BD | | Pu | | | | I | 4' | 3' | 2' | 1'/R | R | Feed | | | | | 1 | 2 | 3 | 4 |
| L | 3 | 4 | | PP | | BD | | Pu | | | | I | 4' | 3' | 2' | 1'/R | R | Feed | | | | 1 | 2 |
| M | 1 | 2 | 3 | 4 | | PP | | BD | | Pu | | | | I | 4' | 3' | 2' | 1'/R | R | Feed | | | |
| N | Feed | | 1 | 2 | 3 | 4 | | PP | | BD | | Pu | | | | I | 4' | 3' | 2' | 1'/R | R | Feed | |
| O | Feed | | | 1 | 2 | 3 | 4 | | PP | | BD | | Pu | | | | I | 4' | 3' | 2' | 1'/R | R | Feed |
| P | Feed | | | | 1 | 2 | 3 | 4 | | PP | | BD | | Pu | | | | I | 4' | 3' | 2' | 1'/R | R | Feed |

| | 1 | 2 | 3 | 4 | 5 | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| A | Feed | | | | | Feed | | | | | Feed | | | | | Feed | | | | | Feed | | | | | Feed | | | | | | | |
| B | 1'/R | R | | | | 1'/R | R | | | | 1'/R | R | | | | 1'/R | R | | | | 1'/R | R | | | | 1'/R | R | | | | | | |
| C | 3' | 2' | | | | 3' | 2' | | | | 3' | 2' | | | | 3' | 2' | | | | 3' | 2' | | | | 3' | 2' | | | | | | |
| D | 5' | 4' | | | | 5' | 4' | | | | 5' | 4' | | | | 5' | 4' | | | | 5' | 4' | | | | 5' | 4' | | | | | | |
| E | Pu | | | | | Pu | | | | | Pu | | | | | Pu | | | | | Pu | | | | | Pu | | | | | | | |
| F | | | | | | | | | | | | | | | | | | | | | | | | | | | | | | | | | |
| G | PP/BD | BD | | | | PP/BD | BD | | | | PP/BD | BD | | | | PP/BD | BD | | | | PP/BD | BD | | | | PP/BD | BD | | | | | | |
| H | PP | | | | | PP | | | | | PP | | | | | PP | | | | | PP | | | | | PP | | | | | | | |
| I | 5 | | | | | 5 | | | | | 5 | | | | | 5 | | | | | 5 | | | | | 5 | | | | | | | |
| J | 4 | 2 | | | | 4 | 2 | | | | 4 | 2 | | | | 4 | 2 | | | | 4 | 2 | | | | 4 | 2 | | | | | | |
| K | 3 | 1 | | | | 3 | 1 | | | | 3 | 1 | | | | 3 | 1 | | | | 3 | 1 | | | | 3 | 1 | | | | | | |
| L | Feed | | | | | Feed | | | | | Feed | | | | | Feed | | | | | Feed | | | | | Feed | | | | | | | |

FIG. 4

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| A | Feed | | Feed | | Feed | | Feed | | Feed | | Feed | | Feed | |
| B | 1'/R | R | 1'/R | R | 1'/R | R | 1'/R | R | 1'/R | R | 1'/R | R | 1'/R | R |
| C | 3' | 2' | 3' | 2' | 3' | 2' | 3' | 2' | 3' | 2' | 3' | 2' | 3' | 2' |
| D | 5' | 4' | 5' | 4' | 5' | 4' | 5' | 4' | 5' | 4' | 5' | 4' | 5' | 4' |
| E | — | 1 | — | 1 | — | 1 | — | 1 | — | 1 | — | 1 | — | 1 |
| F | Pu | | Pu | | Pu | | Pu | | Pu | | Pu | | Pu | |
| G | BD | | BD | | BD | | BD | | BD | | BD | | BD | |
| H | PP | | PP | | PP | | PP | | PP | | PP | | PP | |
| I | — | 5 | — | 5 | — | 5 | — | 5 | — | 5 | — | 5 | — | 5 |
| J | 4 | 3 | 4 | 3 | 4 | 3 | 4 | 3 | 4 | 3 | 4 | 3 | 4 | 3 |
| K | 2 | 1 | 2 | 1 | 2 | 1 | 2 | 1 | 2 | 1 | 2 | 1 | 2 | 1 |
| L | Feed | | Feed | | Feed | | Feed | | Feed | | Feed | | Feed | |
| M | | | | | | | | | | | | | | |
| N | Feed | | | | | | | | | | | | | |

| | | | | | | | | | | | | | | | | | | | | | | | |
|---|---|---|---|---|---|---|---|---|---|---|---|---|---|---|---|---|---|---|---|---|---|---|---|
| A | Feed | | | | | | | | | | | | | | | | | | | | | | |
| B | 1'/R | R | | 1 | 2 | 3 | 4/PP | PP | BD | Pu | | 4' | 3' | 2' | 1'/R | R | | | | | | | |
| C | 3' | 2' | 1'/R | R | | | | | | | | | | | | | 1'/R | R | | | | | |
| D | Pu | 4' | 3' | 2' | | Feed | | | | | | | | | | | 3' | 2' | 4' | 3' | 2' | 4' | 3' | 2' |
| E | | Pu | | | | | | | | | | | | | | | Pu | | | Pu | | | Pu | |
| F | BD | | | | | | | | | | | | | | | | | | BD | | | BD | | |
| G | PP | | BD | | | | | | | | | | | | | | | | PP | | | PP | | |
| H | | PP | | | | | | | | | Feed | | | | | | | | | PP | | | PP | |
| I | 3 | 4/PP | | PP | | | | | | | | | | | Feed | | | | 4/PP | | | 4/PP | | |
| J | 1 | 2 | 3 | 4/PP | | | 1 | 2 | 3 | 4/PP | | 1 | 2 | 3 | | | 1 | 2 | 3 | | 1 | 2 | 3 | |
| K | Feed | | 1 | 2 | | | | | | | | | | | | Feed | | | | | | | | Feed |
| L | | Feed | | | | | | | | | | | | | | | | | | | | | | |

FIG. 11

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| A | Feed | | | | | 1 | 2 | 3/PP | 4/PP | 5/PP | BD | PP | 4/PP | 2 | | |
| B | 1'/R | R | | Feed | | | | | | | | Pu | | | 1'/R | R |
| C | 3' | 2' | 1'/R | R | | | | | Feed | | | | | | 3' | 2' |
| D | 5' | 4' | 3' | 2' | 1'/R | R | | | | | Feed | | | | 5' | 4' |
| E | | Pu | 5' | 4' | 3' | 2' | 1'/R | R | | | | | Feed | | | |
| F | | | | Pu | 5' | 4' | 3' | 2' | 1'/R | R | | | | | Pu | |
| G | BD | | | | | Pu | 5' | 4' | 3' | 2' | 1'/R | R | | | | BD |
| H | 5/PP | PP | | | BD | | | Pu | 5' | 4' | 3' | 2' | 1'/R | R | 5/PP | PP |
| I | 3/PP | 4/PP | 5/PP | PP | | BD | | | | Pu | 5' | 4' | 3' | 2' | 3/PP | 4/PP |
| J | 1 | 2 | 3/PP | 4/PP | 5/PP | PP | | BD | | | | Pu | 5' | 4' | 1 | 2 |
| K | Feed | | 1 | 2 | 3/PP | 4/PP | 5/PP | PP | | BD | | | | Pu | Feed | |
| L | | | Feed | | 1 | 2 | 3/PP | 4/PP | 5/PP | PP | | BD | | | Feed | |

PRESSURE SWING ADSORPTION PROCESS WITH REDUCED PRESSURE EQUALIZATION TIME

BACKGROUND OF THE INVENTION

Pressure swing adsorption is an important gas separation process which is widely used in the chemical process industries. The process has been highly developed in particular for use in the recovery of high purity hydrogen from synthesis gas, refinery offgases, and other hydrogen-containing gas mixtures. The process as known in the art uses multiple adsorbent beds operating in parallel with overlapping cycles to provide selective gas flow between beds for pressure equalization and purge steps. Highly developed cycles are known which use up to 16 beds with multiple beds on feed and multiple beds on purge at any given time. Each bed can undergo multiple pressure equalization steps with other individual beds in order to increase product gas recovery.

Each adsorbent bed in a pressure swing adsorption (PSA) cycle typically utilizes a sequence of steps which begins with a feed or adsorption step in which a pressurized feed gas mixture is passed through a bed of adsorbent which selectively adsorbs one or more of the components in the mixed feed gas. A product gas containing the desired component at acceptable purity is withdrawn from the bed until the adsorption step is terminated at a predetermined time.

After termination of the adsorption step, the pressure in the bed is reduced in a series of pressure equalization steps in which gas is transferred at decreasing pressure to a succession of other beds to provide pressurization to those beds. Final depressurization typically is completed by withdrawing a waste gas in a final blowdown step. The depressurized bed then is purged with purge gas provided from other beds, thereby removing additional adsorbed components from the bed.

Upon completion of the purge step, the bed is repressurized to an intermediate pressure by a succession of pressure equalization steps in which gas is transferred from other beds, and the bed is pressurized further to the feed pressure with feed and/or product gas. The steps are repeated in a cyclic manner.

An objective in the development of pressure swing adsorption cycles is to reduce the cycle time in order to reduce the amount of adsorbent required in the beds for a given feed rate while continuing to provide product at an acceptable product purity. This has the desirable effect of reducing the capital cost of the process equipment required for a given volumetric production rate. The present invention as described below and defined by the claims which follow addresses this need by reducing the required pressure equalization time in a cycle, thereby reducing the overall cycle time and increasing product recovery per unit of adsorbent used.

BRIEF SUMMARY OF THE INVENTION

The invention is a pressure swing adsorption process for recovering a less strongly adsorbable component from a feed gas mixture comprising at least one less strongly adsorbable component and at least one more strongly adsorbable component, which process comprises performing sequential process steps in an adsorbent bed which include an adsorption step, two or more pressure equalization steps at decreasing pressure, a provide purge step, a blowdown step, a purge step, two or more pressure equalization steps at increasing pressure, and a final repressurization step, wherein the duration of each pressure equalization step is less than about 25 seconds and the adsorbent bed is one of at least four parallel adsorbent beds undergoing the sequential process steps in a cyclic manner.

In the process, four or more pressure equalization steps can be carried out at decreasing pressure and four or more pressure equalization steps can be carried out at increasing pressure in the adsorbent bed. Optionally, the provide purge step and the blowdown step can overlap such that gas is withdrawn from the product end of the bed for providing purge to another bed while additional blowdown gas is withdrawn from the other end of the bed. Optionally, the final pressure equalization step at decreasing pressure and the provide purge step can overlap such that gas is withdrawn from one end of the bed for providing purge to another bed while additional gas is withdrawn from the other end of the bed to pressurize yet another bed. Three beds can be on the purge step at any given time.

The adsorbent bed can be one of 12 more parallel adsorbent beds. The feed gas mixture can contain hydrogen, carbon monoxide, carbon dioxide, and one or more hydrocarbons containing one or more carbon atoms, wherein hydrogen is the less strongly adsorbable component. In this process, a series of two or more pressure equalization steps can be effected between an adsorbent bed and other adsorbent beds, and the final differential pressure in one of the pressure equalization steps can be greater than the final differential pressure in any earlier step in the series of two or more pressure equalization steps.

In one embodiment of the invention, the process uses 16 parallel adsorbent beds which undergo the sequential process steps in a cyclic manner. Four beds can be on the adsorption step at any given time. In addition, four pressure equalization steps can be carried out at decreasing pressure and four pressure equalization steps can be carried out at increasing pressure in each of the 16 adsorbent beds. Also, three beds can be on the purge step at any given time. Preferably, each bed on the purge step is purged exclusively by gas provided exclusively from another bed on the provide purge step. Optionally, an idle period can follow the purge step.

In another embodiment of the invention, 14 adsorbent beds are utilized which undergo the sequential steps in a cyclic manner. Three or four beds can be on the adsorption step at any given time and two or three beds can be on the purge step at any given time. Preferably, four or five pressure equalization steps can be carried out at decreasing pressure and four or five pressure equalization steps can be carried out at increasing pressure in each of the 14 adsorbent beds. Optionally, the provide purge step and the blowdown step can overlap such that gas is withdrawn from one end of the bed for providing purge to another bed while additional blowdown gas is withdrawn from the other end of the bed.

In yet another embodiment, 12 adsorbent beds are utilized which undergo the sequential steps in a cyclic manner. Two or three beds can be on the adsorption step at any given time. At least one of the pressure equalization steps at decreasing pressure and the provide purge step can overlap such that gas is withdrawn from the product end of the bed for providing purge to another bed while additional gas is withdrawn from the other end of the bed to pressurize yet another bed. Two beds can be on the purge step at a given time and three beds can be on the purge step at another given time. Optionally, the provide purge step and the blowdown step can overlap such that gas is withdrawn from the product end of the bed for providing purge to another bed while additional blowdown gas is withdrawn from the other end of the bed.

The invention includes a pressure swing adsorption system for operation in a pressure swing adsorption process, wherein the system comprises 16 parallel adsorbent beds which are manifolded such that three beds can be on a purge step at any given time and each bed on the purge step can be purged exclusively by gas provided exclusively from another bed on a provide purge step. The 16 parallel adsorbent beds can be manifolded into four groups of four beds each such that each bed in any given group can provide purge gas exclusively to another bed in the group and can receive purge gas exclusively from yet another bed in the group. The 16 parallel adsorbent beds can be manifolded such that a group of four beds can be isolated from the other 12 beds and the other 12 beds can be operated in a cycle with two beds on feed at any given time, 2 beds on purge at any given time, and two pressure equalizations.

Another embodiment of the invention includes a pressure swing adsorption system for operation in a pressure swing adsorption process, wherein the system comprises 12 parallel adsorbent beds which are manifolded such that two beds can be on a purge step at any given time and each bed on the purge step can be purged exclusively by gas provided exclusively from another bed on a provide purge step. The 12 parallel adsorbent beds can be manifolded into three groups of four beds each such that each bed in a group can provide purge gas exclusively to another bed in the group and can receive purge gas exclusively from yet another bed in the group. The 12 parallel adsorbent beds can be manifolded such that the given group of 4 beds can be isolated from the other 8 beds, wherein the other 8 beds can be operated in a cycle with one or two beds on feed at any given time, one or two beds on purge at any given time, and three pressure equalizations.

BRIEF DESCRIPTION OF SEVERAL VIEWS OF THE DRAWINGS

FIG. 1 is a cycle chart for an embodiment of the invention which utilizes 16 adsorbent beds, four beds on feed, three beds on purge, and four pressure equalization steps.

FIG. 2 is a cycle chart for an embodiment of the invention which utilizes 16 adsorbent beds, four beds on feed, three beds on purge, and five pressure equalization steps.

FIG. 3 is a cycle chart for an embodiment of the invention which utilizes 16 adsorbent beds, four beds on feed, three beds on purge, and five pressure equalization steps, with a simultaneous provide purge and blowdown step.

FIG. 4 is a cycle chart for an embodiment of the invention which utilizes 14 adsorbent beds, three beds on feed, two beds on purge, and five pressure equalization steps.

FIG. 5 is a cycle chart for an embodiment of the invention which utilizes 14 adsorbent beds, three beds on feed, two or three beds on purge, and five pressure equalization steps, with a simultaneous provide purge and blowdown step.

FIG. 6 is a cycle chart for an embodiment of the invention which utilizes 14 adsorbent beds, three beds on feed, three beds on purge, and four pressure equalization steps, with a simultaneous provide purge and blowdown step.

FIG. 7 is a cycle chart for an embodiment of the invention which utilizes 14 adsorbent beds, four beds on feed, two or three beds on purge, and four pressure equalization steps.

FIG. 8 is a cycle chart for an embodiment of the invention which utilizes 12 adsorbent beds, two beds on feed, two or three beds on purge, and four pressure equalization steps, with a simultaneous provide purge and blowdown step.

FIG. 9 is a cycle chart for an embodiment of the invention which utilizes 12 adsorbent beds, three beds on feed, two beds on purge, and four pressure equalization steps, with a simultaneous provide purge and blowdown step.

FIG. 10 is a cycle chart for an embodiment of the invention which utilizes 12 adsorbent beds, three beds on feed, two beds on purge, and four pressure equalization steps, with a simultaneous pressure equalization and provide purge step.

FIG. 11 is a cycle chart for an embodiment of the invention which utilizes 12 adsorbent beds, three beds on feed, two beds on purge, and five pressure equalization steps, with three simultaneous pressure equalization and provide purge steps.

DETAILED DESCRIPTION OF THE INVENTION

The present invention is a pressure swing adsorption (PSA) process for recovering a less strongly adsorbable component from a feed gas mixture comprising at least one less strongly adsorbable component and at least one more strongly adsorbable component, which utilizes sequential steps in an adsorbent bed which include an adsorption step, two or more pressure equalization steps at decreasing pressure, a provide purge step, a blowdown step, a purge step, two or more pressure equalization steps at increasing pressure, and a final repressurization step. The invention has a number of embodiments which can utilize combinations of 12, 14, or 16 beds, three or four beds on feed simultaneously, two or three beds on purge simultaneously, and two or more, preferably four or five, pressure equalization steps. The invention can be carried out in PSA systems with as few as four beds, which is the minimum number of beds required for two pressure equalizations.

The common feature of all embodiments of the invention is that the duration of each pressure equalization (PE) step is less than about 25 which is a shorter pressure equalization time than previously used in PSA cycles. It was discovered in the development of the invention that shorter PE times are possible when two or more beds are on purge at any given time.

When the overall cycle time is shortened such that the PE step is reduced to less than about 30 seconds, two things happen. First, the purge time is reduced in proportion to the shortened cycle time, and therefore the purge rate increases and the pressure drop through the purged bed also increases. The higher pressure drop during the purge step results in higher bed pressures during the purge step, since the pressure at the outlet of the bed during the purge step is essentially a constant. From the adsorption isotherm it is known that more adsorbed components are retained in the bed at a higher purge pressure for a given volume of purge gas, and therefore purge at higher pressure is less effective at desorbing the more strongly adsorbable components from the bed compared with purge at lower pressure. As a result, while the amounts of waste gas from the blowdown and purge steps are essentially constant, the product recovery is reduced because less feed gas can be processed in a given cycle.

Second, as PE time is reduced, the purge step requires a higher purge gas flow rate, and the lifting force in the bed providing purge gas will increase. This can cause undesirable bed fluidization, which occurs because the bed providing purge is depressurized in an upward direction. In order to avoid this problem, conventional PSA cycles have used PE times of greater than about 25 seconds.

When two or more beds are on purge, the gas flow rate in each bed on purge is reduced compared to the gas flow rate with only one bed on purge. This reduces the pressure drop through the bed being purged, and results in improved product recovery and adsorbent working capacity. As noted above, when the cycle time is reduced, the purge time also will be reduced, and this results in a higher pressure drop in the purged bed. However, since the purge flow per bed is reduced by a factor of two or more when two or more beds are on purge, a doubling of the total purge flow results in a pressure drop no higher than when only one bed is on purge.

Reducing the cycle time by 50%, for example, can reduce the amount of adsorbent by almost 50% if mass transfer resistance does not affect adsorption rate significantly, and this greatly reduces the cost of adsorbent and bed vessels. If the preferred cycle time requires a PE time of 40 seconds when one bed is on purge, the PE time can be reduced to 20 seconds or less when two or more beds are simultaneously on purge. This is the theoretical basis for using shorter cycle times with two or more beds on purge according to the present invention.

As mentioned above, as the cycle time decreases, the gas flow rate between the beds during each PE step increases. When a depressurizing bed is long enough or the gas flow velocity is high enough, the potential for adsorbent fluidization in the bed becomes a concern. This concern about fluidization is a factor which prevented the use of shorter PSA cycle times in the past.

In the present invention, partial pressure equalization can be used during the pressure equalization steps at lower pressures to minimize fluidization in the depressurizing bed. The term "partial pressure equalization" defines a pressure equalization step in which the final differential pressure between the two beds is greater than zero. For example, when four steps of pressure equalization are used in a cycle, the final differential pressure between two beds.undergoing pressure equalization is set typically at 0.2 atm. The final differential pressure is defined as the absolute differential pressure between the two beds at the end of a pressure equalization step. The highest lifting force in a depressurizing bed occurs in the last step of pressure equalization because much greater gas volumes are transferred at lower pressures. This occurs in part because of the lower absolute pressure and in part because of the greater amount of gas desorbed from the adsorbent at lower pressures. In addition, in the first PE step the pressurizing bed can be receiving repressurization gas from another source, which reduces the gas flow from the depressurizing bed. As mentioned above, when a depressurizing bed is long enough or the gas flow velocity is high enough, the potential for adsorbent fluidization in the bed becomes a concern. This is addressed in the present invention by using a final differential pressure of 0.2 atm or less for the initial PE steps, and then using a final differential pressure of at least 0.4 atm and up to 2.5 atm for the last PE step.

When the final differential pressure increases, the amount of gas transferred during that equalization step is reduced. If this results in insufficient pressurization gas for the receiving bed, one or more additional steps of pressure equalization can be added. Typically, the final differential pressure during the last equalization step should be greater than the final differential pressure which occurs in earlier PE steps at higher pressure levels. Thus when the PE steps are reduced to less than 25 seconds each, the overall PSA cycle time is reduced in proportion, and this results in greater single train feed capacity.

The cycles of the present invention can be used to recover hydrogen from a steam methane reformate in the 15–40 atma pressure range. Typical components and composition ranges for a steam methane reformate feed to the PSA process are (in volume %) 70–79% hydrogen, 14–23% carbon dioxide, 1–7% methane, 0.1–5% carbon monoxide, 0–3% nitrogen, and 0.1–1% water. The cycles disclosed here also may be used for the separation of other gas mixtures such as hydrogen-containing offgases from ethylene or methanol production plants. The adsorbent or adsorbents used in the PSA process can be selected from numerous commercially-available adsorbents known in the art. In this application, the adsorbent bed can contain a layer of activated carbon near the feed end and a layer of zeolite near the product end of the bed, such as for example a type 4A, 5A, or X type zeolite. A typical carbon to zeolite ratio is about 1:1. When the feed is in the pressure range of 15–40 atma, the optimum number of pressure equalization steps is typically three to five. When partial pressure equalization is used, additional pressure equalizations may be required.

The PSA process of the present invention can operate in a number of embodiments. In each of these embodiments described below, a plurality of adsorbent beds is operated in parallel and each bed proceeds through identical cyclic steps. The cycles of the beds are staggered to allow the transfer of purge and pressure equalization gas between beds, and also to allow the simultaneous operation of multiple beds on the feed and purge steps at any given time in the overall cycle.

In each of the embodiments of the invention, a single adsorbent bed proceeds in sequence through the steps described and defined below.

1) The feed step begins at an initial feed pressure following repressurization. A mixed feed gas containing at least one more strongly adsorbable component and at least one less strongly adsorbable component is passed into the feed end of the adsorbent bed which contains one or more adsorbents which retain the more strongly adsorbed components. The average bed pressure at the beginning of this step is the initial feed pressure. A product gas enriched in the less strongly adsorbed components is withdrawn from the product end of the bed. The feed step continues for a predetermined time and is terminated prior to breakthrough of the more strongly adsorbed components.

2) Pressure equalization at decreasing bed pressure is initiated in which gas is withdrawn at decreasing pressure from the adsorbent bed and transferred to other beds in turn which are undergoing pressure equalization at increasing pressure as described later. Pressure equalization gas is withdrawn cocurrently, that is, in the same direction as the gas flow in the feed step. Pressure equalization at decreasing bed pressure is effected in two or more steps, preferably four or five steps, in which the gas withdrawn from the adsorbent bed is transferred in turn to four or five other beds which receive the gas at increasing bed pressures. Preferably the elapsed time for each pressure equalization step is less than about 25 seconds as discussed earlier.

In any given pressure equalization step, the pressure in the bed from which gas is withdrawn (i.e. the bed which is decreasing in pressure) approaches the pressure in the bed receiving the gas (i.e. the bed which is increasing in pressure). In the limit, if the pressure equalization step duration is sufficiently long, these two pressures will become equal, and the final differential pressure will be zero. In actual practice, however, the pressures may not become equal and the final differential pressure may be greater than zero.

The term "final differential pressure" is defined as the absolute differential pressure between the two beds at the end of a pressure equalization step. The term "partial pressure equalization" defines a pressure equalization step in which the final differential pressure is greater than zero. The term "pressure equalization" is used herein to describe the transfer of gas from one bed at decreasing pressure to another bed at increasing pressure and applies to any pressure equalization step which has any final differential pressure, including zero.

In one embodiment of the invention, a series of pressure equalization steps is used in which the final differential pressure increases in each successive PE step. In the most general embodiment of a series of pressure equalization steps, the final differential pressure in a pressure equalization step is greater than the final differential pressure in any earlier step. The final differential pressure in the final pressure equalization step can be up to about 2.5 atm. In one example of this embodiment, the final differential pressures in a series of five pressure equalization steps are 0.2, 0.7, 1.2, 1.8, and 2.5 atm respectively. Other combinations of final differential pressures can be used, but at least one final differential pressure is greater than the final differential pressure in at least one earlier PE step.

3) The provide purge step begins after the last pressure equalization step is completed. Additional gas is withdrawn cocurrently from the adsorbent bed at further decreasing pressures and this gas is used to purge other beds to desorb the more strongly adsorbed components in these beds. In an optional mode of operation, an initial portion of the provide purge step can overlap with one or more of the pressure equalization steps such that gas withdrawn from a bed can be used in part for pressure equalization and in part for providing purge.

4) In the blowdown step, a final volume of gas is withdrawn countercurrently from the adsorbent bed and discharged from the system for fuel or other uses. The pressure in the bed at the end of the blowdown step is the minimum bed pressure in the cycle. In an optional mode of operation, the last portion of the provide purge step and the initial portion of the blowdown step can be carried out simultaneously.

5) In the purge step, gas from another bed in the provide purge step is passed through the bed at minimum bed pressure to sweep void space gas and desorb remaining adsorbed components, thereby regenerating the adsorbent.

6) Pressure equalization at increasing bed pressure is initiated in which gas is introduced stepwise at increasing pressure into the adsorbent bed in turn from other beds which are undergoing pressure equalization at decreasing pressure as described above. Pressure equalization gas typically is introduced into the bed countercurrently, that is, in the opposite direction to the gas flow in the feed step. The overall pressure equalization at increasing bed pressure is effected in two or more steps, preferably four or five steps, in which the gas introduced into the adsorbent bed is transferred in turn from four or five other beds which provide the gas in turn at increasing bed pressures. Preferably the elapsed time for each pressure equalization step is less than about 25 seconds as discussed earlier.

In any given pressure equalization step, the pressure in the bed from which gas is withdrawn (i.e. the bed which is decreasing in pressure) approaches the pressure in the bed receiving the gas (i.e. the bed which is increasing in pressure). In the limit, if the pressure equalization step duration were sufficiently long, these two pressures would become equal, and the final differential pressure would be zero. In actual practice, however, the pressures may not become equal and the final differential pressure may be greater than zero.

The term "final differential pressure" is defined as the absolute differential pressure between the two beds at the end of a pressure equalization step. The term "partial pressure equalization" defines a pressure equalization step in which the final differential pressure is greater than zero. The term "pressure equalization" is used herein to describe the transfer of gas from one bed at decreasing pressure to another bed at increasing pressure and applies to any pressure equalization step which has any final differential pressure, including zero.

In one embodiment of the invention as described above, a series of pressure equalization steps is used in which the final differential pressure increases in each successive step. In the most general embodiment of a series of pressure equalization steps, the final differential pressure in a pressure equalization step is greater than the final differential pressure in any earlier step. The final differential pressure in the final pressure equalization step can be up to about 2.5 atm. In one example of this embodiment, the final differential pressures in a series of five pressure equalizations are 0.2, 0.7, 1.2, 1.8, and 2.5 atm respectively.

In the above discussion of pressure equalization steps, several terms are used which are related as follows. The term "pressure equalization at decreasing pressure" refers to an individual bed which is decreasing in pressure by the transfer of gas in turn to one or more other beds which are increasing in pressure. The term "pressure equalization at increasing pressure" refers to an individual bed which is increasing in pressure by the receipt of gas in turn from one or more other beds which are decreasing in pressure. For a given pair of beds, a pressure equalization step at decreasing pressure and a pressure equalization step at increasing pressure occur simultaneously. The generic term "pressure equalization" refers to a pair of beds between which gas is transferred wherein one bed is decreasing in pressure and the other bed is increasing in pressure. A pressure equalization step between two beds by definition therefore includes pressure equalization at decreasing pressure in one bed and pressure equalization at increasing pressure in the other bed.

7) The repressurization step proceeds by introducing pressurized feed gas into the feed end of the bed, introducing product gas into the product end of the bed, or by simultaneously introducing pressurized feed gas into the feed end of the bed and introducing product gas into the product end of the bed. The repressurization step is considered complete when the average bed pressure reaches the initial feed pressure, at which time the cycle proceeds again to the feed step described above. In an optional mode of operation, the last step of pressure equalization at increasing pressure is carried out simultaneously with an initial portion of the repressurization step.

Typical ranges of the elapsed times for the cycle steps described above are as follows: feed, 40–120 seconds; each pressure equalization step at decreasing pressure, 10–25 seconds; provide purge, 40–200 seconds; blowdown, 10–100 seconds; purge, 40–200 seconds; each pressure equalization step at increasing pressure, 10–25 seconds; and repressurization, 20–50 seconds. Total cycle time can range from 200 to 1000 seconds. If necessary, an idle step can be inserted between steps so that the necessary overlap of steps among beds can be effected. For example, an idle step could be inserted after the purge step and prior to pressure equalization at increasing pressure. During an idle step, the bed is inactive and typically isolated from the other beds.

Typical pressure ranges for the above steps are as follows: feed step, 20–40 atma; pressure equalization steps at decreasing pressures, 5–40 atma; provide purge step, 3–8 atma; blowdown step, 3–5 atma; purge step, 1.1–1.6 atma; pressure equalization steps at increasing pressures, 1.1–36 atma; and repressurization step, 16–40 atma.

Figure 1:
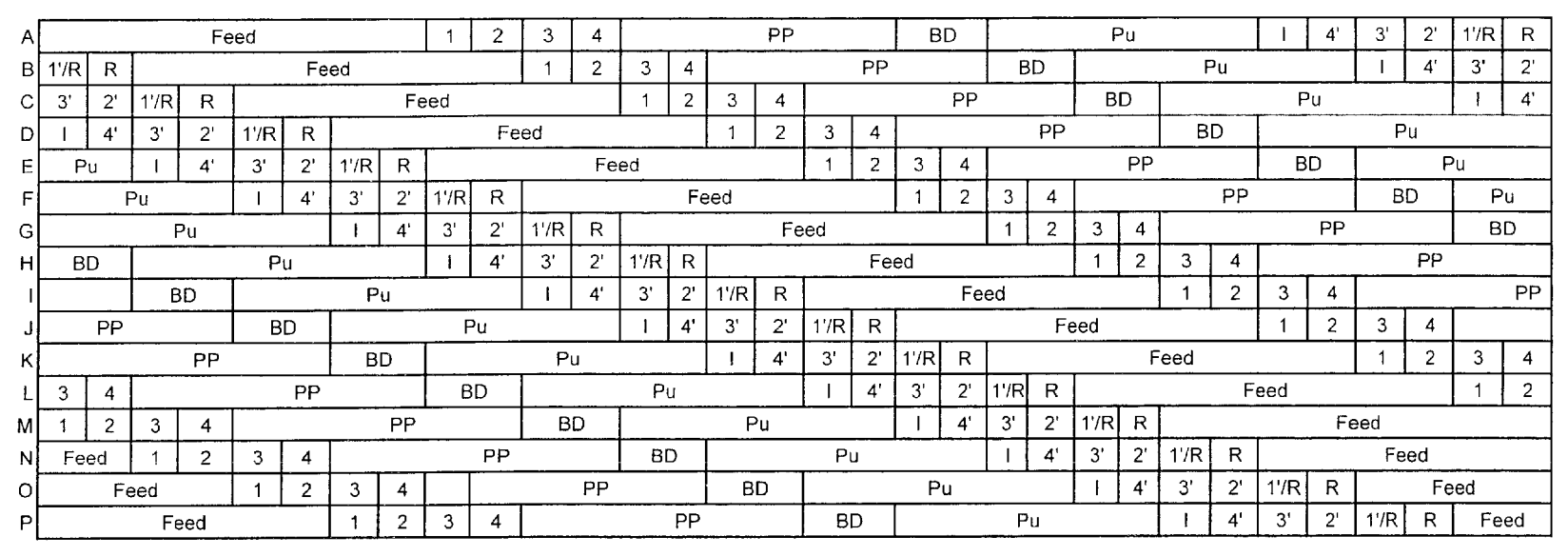

A first embodiment of the invention is illustrated by the cycle chart of FIG. 1, which is a process cycle utilizing 16 parallel beds identified by the letters A through P. In this chart and following charts, the sequential steps are shown as a function of time for each bed, wherein the cycles of the beds are staggered to allow the required transfer of gas between beds in pressure equalization and purge steps. The cycles also are arranged such that at any given time in the cycle, four beds are on the feed step, three beds are on the purge step, and three beds are on the provide purge step. Four steps of pressure equalization are used. In this and the following embodiments, the final pressure equalization step at increasing pressure overlaps with the initial repressurization step. This overlapping step is optional, however, and cycles without this overlapping step are within the scope of the invention.

The 16 parallel beds in this embodiment are manifolded such that three beds are on a purge step at any given time and each bed on the purge step is purged exclusively by gas provided exclusively from another bed on a provide purge step. The beds preferably are manifolded into four groups of four beds each such that each bed in a given group provides purge gas exclusively to another bed in the group and receives purge gas exclusively from yet another bed in the group. In the cycle chart of FIG. 1, the four groups of beds are AEIM, BFJN, CGKO, and DHLP respectively. In group AEIM, for example, bed A provides purge to bed M and receives purge from bed E, bed E provides purge to bed A and receives purge from bed I, bed I provides purge to bed E and receives purge from bed M, and bed M provides purge to bed I and receives purge from bed A. No purge manifold is needed to connect beds in a given group with beds in another group, thereby simplifying piping in the system and simplifying control of the purge gas flow.

An additional feature of the embodiment of FIG. 1 is that the 16 beds are manifolded such that any given group of four beds can be isolated from the other 12 beds and the other 12 beds can be operated in a different cycle with four beds on feed at any given time, 2 beds on purge at any given time, and two pressure equalizations. For example, the group of beds AEIM can be isolated from the other groups of beds BFJN, CGKO, and DHLP, which can be operated as described.

In FIG. 1 and in FIGS. 2–11 below for other embodiments, the following identifiers are used: Feed is the feed step; 1, 2, 3, and 4 are pressure equalization steps at decreasing pressure; PP is the provide purge step; BD is the blowdown step; Pu is the purge step; I is the idle step; 4', 3', and 2' are pressure equalization steps at increasing pressure; 1'/R is the optional combined step of pressure equalization at increasing pressure and repressurization; and R is the repressurization step. If optional step 1'/R is not used, a final pressure equalization step at increasing pressure, 1' (not shown), is used. In a typical application of the embodiment of FIG. 1, the durations of the cycle steps are as follows: feed, 40–120 seconds; each pressure equalization step at decreasing pressure, 10–25 seconds; provide purge, 60–150 seconds; blowdown, 20–50 seconds; purge, 60–150 seconds; idle, 10–25 seconds; each pressure equalization step at increasing pressure, 10–25 seconds; and repressurization, 20–50 seconds.

Figure 2:
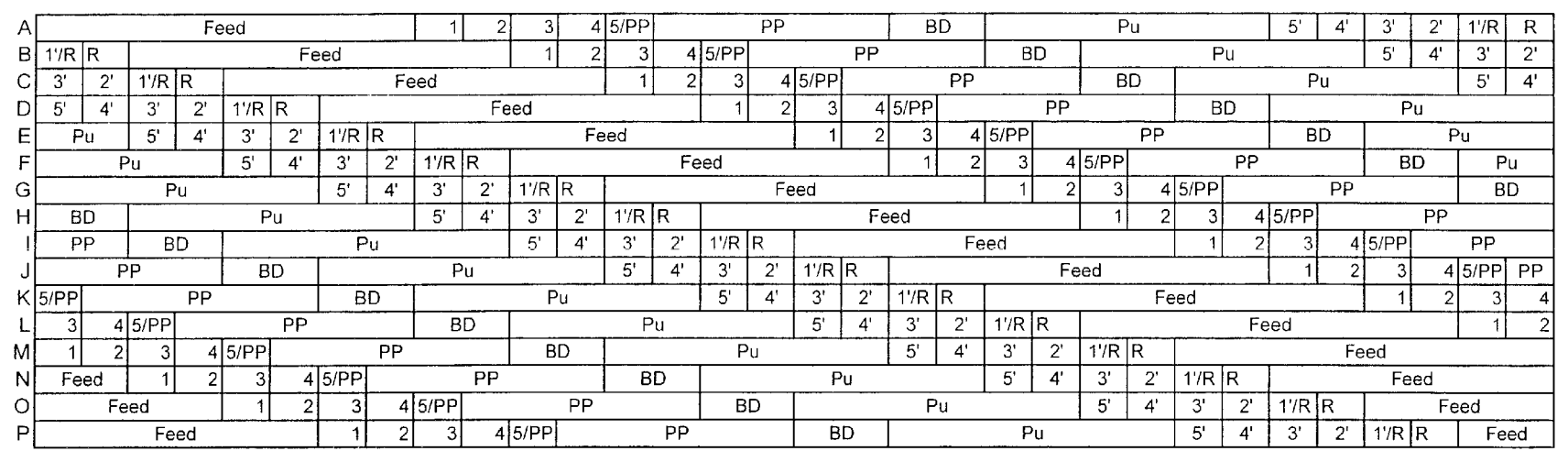

A second embodiment of the invention is illustrated by the cycle chart of FIG. 2, which is a process cycle utilizing 16 parallel beds identified by the letters A through P. In this chart, the steps are identified using the same terminology as above. The cycles are arranged such that at any given time in the cycle, four beds are on the feed step, three beds are on the purge step, and three beds are on the provide purge step. Five steps of pressure equalization are used, and the fifth pressure equalization step at decreasing pressure overlaps with the provide purge step wherein a portion of the withdrawn gas provides equalization to another bed and the remaining withdrawn gas provides purge to yet another bed. This step is identified as 5/PP.

A third embodiment of the invention is illustrated by the cycle chart of FIG. 3, which is a process cycle utilizing 16 parallel beds identified by the letters A through P. In this chart, the steps are identified using the same terminology as above. The cycles are arranged such that at any given time in the cycle, four beds are on the feed step, three beds are on the purge step, and three beds are on the provide purge step. Five steps of pressure equalization are used. The final portion of the provide purge step and the initial portion of the blowdown step overlap in a combined step identified as PP/BD.

A fourth embodiment of the invention is illustrated by the cycle chart of FIG. 4, which is a process cycle utilizing 14 parallel beds identified by the letters A through N. In this chart, the steps are identified using the same terminology as above. The cycles are arranged such that at any given time in the cycle, three beds are on the feed step, two beds are on the purge step, and two beds are on the provide purge step. Five steps of pressure equalization are used.

Figure 5:
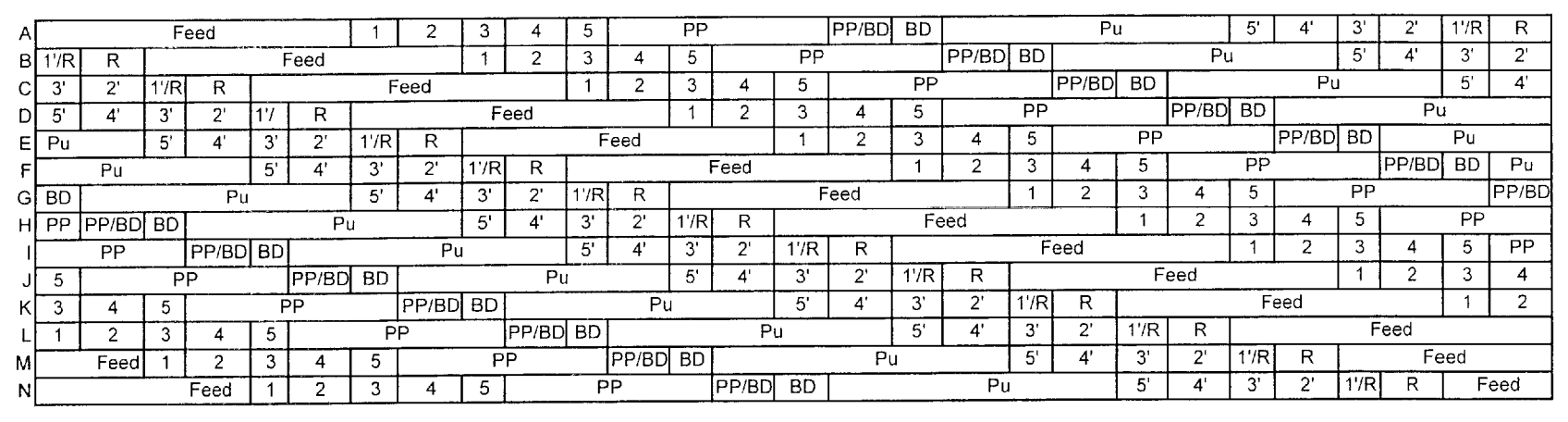

A fifth embodiment of the invention is illustrated by the cycle chart of FIG. 5, which is a process cycle utilizing 14 parallel beds identified by the letters A through N. In this chart, the steps are identified using the same terminology as above. The cycles are arranged such that at any given time in the cycle, three beds are on the feed step and two beds are on the provide purge step. During some portions of the cycle, two beds are on purge with purge gas provided by beds on the provide purge step. During other portions of the cycle, three beds are on purge with two beds receiving purge gas from beds on the provide purge step and one bed receiving purge gas from a bed on a combined provide purge/blowdown step. The final portion of the provide purge step and the initial portion of the blowdown step overlap in this combined provide purge/blowdown step which is identified as PP/BD. Five steps of pressure equalization are used, and the final portion of the provide purge step and the initial portion of the blowdown step overlap in a combined step identified as PP/BD.

Figure 6:
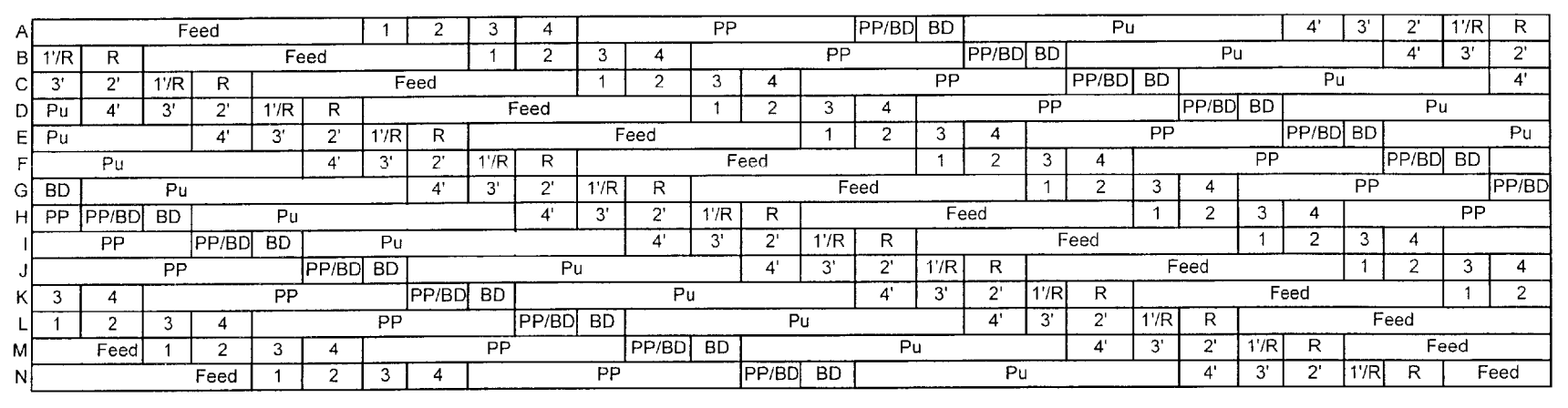

A sixth embodiment of the invention is illustrated by the cycle chart of FIG. 6, which is a process cycle utilizing 14 parallel beds identified by the letters A through N. In this chart, the steps are identified using the same terminology as above. The cycles are arranged such that at any given time in the cycle, three beds are on the feed step, three beds are on the purge step, and two or three beds provide purge gas to the beds being purged. Four steps of pressure equalization are used, and the final portion of the provide purge step and the initial portion of the blowdown step overlap in a combined step identified as PP/BD.

Figure 7:
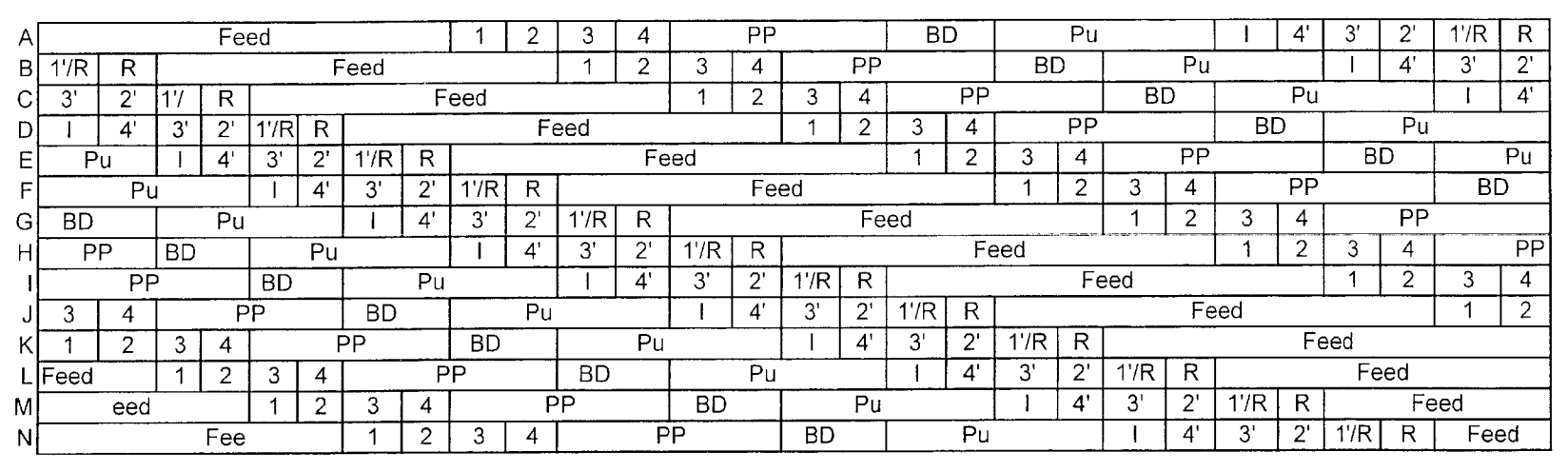

A seventh embodiment of the invention is illustrated by the cycle chart of FIG. 7, which is a process cycle utilizing 14 parallel beds identified by the letters A through N. In this chart, the steps are identified using the same terminology as above. The cycles are arranged such that at any given time in the cycle, four beds are on the feed step, two beds are on the purge step, and two beds are on the provide purge step. Four steps of pressure equalization are used.

Figure 8:
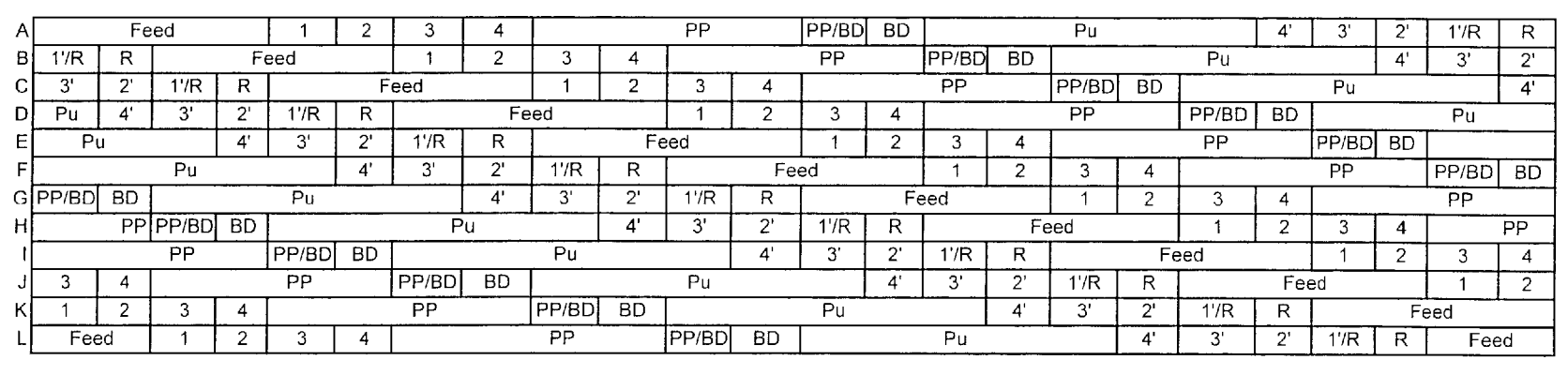

An eighth embodiment of the invention is illustrated by the cycle chart of FIG. 8, which is a process cycle utilizing 12 parallel beds identified by the letters A through L. In this chart, the steps are identified using the same terminology as above. The cycles are arranged such that at any given time in the cycle, two beds are on the feed step. During portions of the cycle, three beds are on the purge step; during other portions of the cycle, two beds are on the purge step. Three beds provide purge gas to the beds being purged, two of them on the provide purge step and one on a provide purge/blowdown step. Four steps of pressure equalization are used, and the final portion of the provide purge step and the initial portion of the blowdown step overlap in the combined provide purge/blowdown step which is identified as PP/BD.

The 12 parallel beds in this embodiment are manifolded such that two or three beds are on a purge step at any given time and each bed on the purge step is purged exclusively by gas provided exclusively from another bed on a provide purge step and a provide purge/blowdown step. The beds preferably are manifolded into three groups of four beds each such that each bed in a given group provides purge gas exclusively to another bed in the group and receives purge gas exclusively from yet another bed in the group. In the cycle chart of FIG. 8, the three groups of beds are ADGJ, BEHK, and CFIL respectively. In group ADGJ, for example, bed A provides purge to bed J and receives purge from bed D, bed D provides purge to bed A and receives purge from bed G, bed G provides purge to bed D and receives purge from bed J, and bed J provides purge to bed G and receives purge from bed A. No purge manifold is needed to connect beds in a given group with beds in another group, thereby simplifying piping in the system and simplifying control of the purge gas flow.

An additional feature of the embodiment of FIG. 8 is that the 12 beds can be manifolded such that any given group of four beds can be isolated from the other 8 beds such that the other 8 beds can be operated in a different cycle with one or two beds on feed at any given time, one or two beds on purge at any given time, and three pressure equalizations. For example, the group of beds ADGJ can be isolated from the other groups of beds BEHK and CFIL, which can be operated as described.

Figure 9:
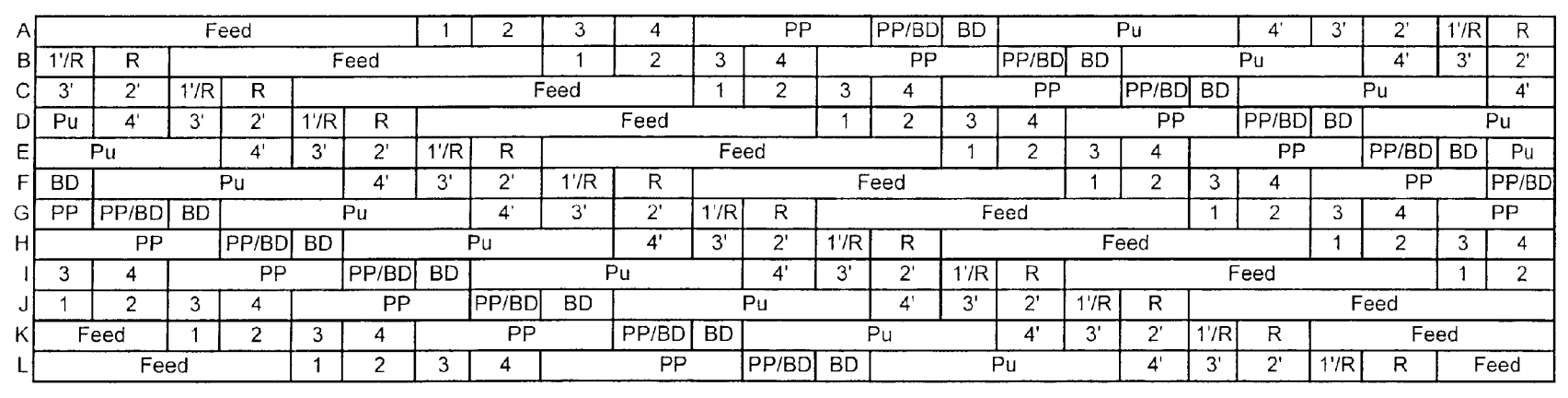

A ninth embodiment of the invention is illustrated by the cycle chart of FIG. 9, which is a process cycle utilizing 12 parallel beds identified by the letters A through L. In this chart, the steps are identified using the same terminology as above. The cycles are arranged such that at any given time in the cycle, three beds are on the feed step, two beds are on the purge step, and one or two beds are on the provide purge step. The final portion of the provide purge step and the initial portion of the blowdown step overlap in a combined provide purge/blowdown step identified as PP/BD, which provides purge when only one other bed is on a provide purge step. Four steps of pressure equalization are used.

A tenth embodiment of the invention is illustrated by the cycle chart of FIG. 10, which is a process cycle utilizing 12 parallel beds identified by the letters A through L. In this chart, the steps are identified using the same terminology as above. The cycles are arranged such that at any given time in the cycle, three beds are on the feed step, two beds are on the purge step, and two beds are on the provide purge step. Four steps of pressure equalization are used, and the fourth pressure equalization step at decreasing pressure overlaps with the provide purge step wherein a portion of the withdrawn gas provides equalization to another bed and the remaining withdrawn gas provides purge to yet another bed. This step is identified as 4/PP.

An eleventh embodiment of the invention is illustrated by the cycle chart of FIG. 11, which is a process cycle utilizing 12 parallel beds identified by the letters A through L. In this chart, the steps are identified using the same terminology as above. The cycles are arranged such that at any given time in the cycle, three beds are on the feed step, and two beds are on the purge step. Five steps of pressure equalization are used, and the third, fourth, and fifth pressure equalization steps at decreasing pressure overlap with the provide purge step wherein portions of the withdrawn gas provide equalization to other beds and the remaining withdrawn gas provides purge to yet another bed. These overlapping steps are identified as 3/PP, 4/PP, and 5/PP. Purge gas to a given bed on purge is supplied by another bed which proceeds through steps 3/PP, 4/PP, 5/PP, and PP (provide purge).

Thus the present invention offers a method to reduce the cycle time in a pressure swing adsorption process by reducing the required pressure equalization time in a cycle, thereby reducing the overall cycle time and increasing product recovery per unit of adsorbent used. This reduces the amount of adsorbent required in the beds for a given feed rate while continuing to provide product at an acceptable product purity, and has the desirable effect of reducing the capital cost of the process equipment required for a given volumetric production rate.

The characteristics of the present invention are described completely in the foregoing disclosure. One skilled in the art can understand the invention from this disclosure and can make various modifications to the invention which are within the scope of the claims which follow.

What is claimed is:

1. A pressure swing adsorption process for recovering a less strongly adsorbable component from a feed gas mixture comprising at least one less strongly adsorbable component and at least one more strongly adsorbable component, which process comprises performing sequential process steps in an adsorbent bed which include an adsorption step, two or more pressure equalization steps at decreasing pressure, a provide purge step, a blowdown step, a purge step, two or more pressure equalization steps at increasing pressure, and a final repressurization step, wherein the duration of each pressure equalization step is less than about 25 seconds and the adsorbent bed is one of at least four parallel adsorbent beds undergoing the sequential process steps in a cyclic manner.

2. The process of claim 1 wherein the adsorbent bed is one of 12 or more parallel adsorbent beds.

3. The process of claim 1 wherein the feed gas mixture contains hydrogen, carbon monoxide, carbon dioxide, and one or more hydrocarbons containing one or more carbon atoms, wherein hydrogen is the less strongly adsorbable component.

4. The process of claim 1 wherein a series of two or more pressure equalization steps is effected between an adsorbent bed and other adsorbent beds, and wherein the final differential pressure in one of the pressure equalization steps is greater than the final differential pressure in any earlier step in the series of two or more pressure equalization steps.

5. The process of claim 1 wherein 16 parallel adsorbent beds undergo the sequential process steps in a cyclic manner.

6. The process of claim 5 wherein four beds are on the adsorption step at any given time.

7. The process of claim 6 wherein four pressure equalization steps are carried out at decreasing pressure and four pressure equalization steps are carried out at increasing pressure in each of the 16 adsorbent beds.

8. The process of claim 7 wherein three beds are on the purge step at any given time.

9. The process of claim 8 wherein each bed on the purge step is purged exclusively by gas provided exclusively from another bed on the provide purge step.

10. The process of claim 9 which further comprises an idle period following the purge step.

11. The process of claim 1 wherein four or more pressure equalization steps are carried out at decreasing pressure and four or more pressure equalization steps are carried out at increasing pressure in the adsorbent bed.

12. The process of claim 1 wherein the provide purge step and the blowdown step overlap such that gas is withdrawn from the product end of the bed for providing purge to another bed while additional blowdown gas is withdrawn from the other end of the bed.

13. The process of claim 1 wherein the final pressure equalization step at decreasing pressure and the provide purge step overlap such that gas is withdrawn from one end of the bed for providing purge to another bed while additional gas is withdrawn from the other end of the bed to pressurize yet another bed.

14. The process of claim 1 wherein three beds are on the purge step at any given time.

15. The process of claim 1 wherein 14 parallel adsorbent beds undergo the sequential steps in a cyclic manner.

16. The process of claim 15 wherein three or four beds are on the adsorption step at any given time.

17. The process of claim 15 wherein two or three beds are on the purge step at any given time.

18. The process of claim 15 wherein four or five pressure equalization steps are carried out at decreasing pressure and four or five pressure equalization steps are carried out at increasing pressure in each of the 14 adsorbent beds.

19. The process of claim 15 wherein the provide purge step and the blowdown step overlap such that gas is withdrawn from one end of the bed for providing purge to another bed while additional blowdown gas is withdrawn from the other end of the bed.

20. The process of claim 1 wherein 12 parallel adsorbent beds undergo the sequential steps in a cyclic manner.

21. The process of claim 20 wherein two or three beds are on the adsorption step at any given time.

22. The process of claim 20 wherein at least one of the pressure equalization steps at decreasing pressure and the provide purge step overlap such that gas is withdrawn from the product end of the bed for providing purge to another bed while additional gas is withdrawn from the other end of the bed to pressurize yet another bed.

23. The process of claim 20 wherein two beds are on the purge step at a given time and three beds are on the purge step at another given time.

24. The process of claim 20 wherein the provide purge step and the blowdown step overlap such that gas is withdrawn from the product end of the bed for providing purge to another bed while additional blowdown gas is withdrawn from the other end of the bed.

25. A pressure swing adsorption system for operation in a pressure swing adsorption process, which system comprises 16 parallel adsorbent beds which are manifolded such that three beds can be on a purge step at any given time and each bed on the purge step can be purged exclusively by gas provided exclusively from another bed on a provide purge step.

26. The pressure swing adsorption system of claim 25 wherein the 16 parallel adsorbent beds can be manifolded into four groups of four beds each such that each bed in any given group can provide purge gas exclusively to another bed in the group and can receive purge gas exclusively from yet another bed in the group.

27. The pressure swing adsorption system of claim 26 wherein the 16 parallel adsorbent beds are manifolded such that a group of four beds can be isolated from the other 12 beds and wherein the other 12 beds can be operated in a cycle with two beds on feed at any given time, 2 beds on purge at any given time, and two pressure equalizations.

28. A pressure swing adsorption system for operation in a pressure swing adsorption process, which system comprises 12 parallel adsorbent beds which are manifolded such that two beds can be on a purge step at any given time and each bed on the purge step can be purged exclusively by gas provided exclusively from another bed on a provide purge step.

29. The pressure swing adsorption system of claim 28 wherein the 12 parallel adsorbent beds are manifolded into three groups of four beds each such that each bed in a group can provide purge gas exclusively to another bed in the group and can receive purge gas exclusively from yet another bed in the group.

30. The pressure swing adsorption system of claim 29 wherein the 12 parallel adsorbent beds are manifolded such that the given group of 4 beds can be isolated from the other 8 beds, wherein the other 8 beds can be operated in a cycle with one or two beds on feed at any given time, one or two beds on purge at any given time, and three pressure equalizations.

* * * * *